(12) United States Patent
Inagaki et al.

(10) Patent No.: US 7,779,972 B2
(45) Date of Patent: Aug. 24, 2010

(54) PARKING BRAKE SYSTEM

(75) Inventors: Hiromi Inagaki, Saitama (JP); Akira Hiratsuka, Nagano (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 781 days.

(21) Appl. No.: 10/592,182

(22) PCT Filed: Mar. 30, 2005

(86) PCT No.: PCT/JP2005/006031

§ 371 (c)(1),
(2), (4) Date: Apr. 4, 2007

(87) PCT Pub. No.: WO2005/095817

PCT Pub. Date: Oct. 13, 2005

(65) Prior Publication Data

US 2007/0193838 A1 Aug. 23, 2007

(30) Foreign Application Priority Data

Mar. 31, 2004 (JP) ............................. 2004-107501

(51) Int. Cl.
*F16D 65/24* (2006.01)

(52) U.S. Cl. .................... 188/265; 188/170; 188/106 F (58) Field of Classification Search ................ 188/2 D, 188/74, 78, 79, 323, 79.55, 79.57, 79.58, 188/79.59, 79.6, 79.61, 79.62, 79.63, 79.64, 188/265, 31, 166, 170, 106 A, 106 F, 65.1, 188/67; 92/24, 27, 28, 30; 403/109.1, 109.2, 403/109.3, 179, 186, 187, 196, 202, 409.1; 292/262, 277, 305

See application file for complete search history.

(56) References Cited

U.S. PATENT DOCUMENTS

| | | | | |
|---|---|---|---|---|
| 2,099,453 A | * | 11/1937 | Searle | 188/265 |
| 2,899,025 A | * | 8/1959 | Marosi | 188/170 |
| 3,759,147 A | * | 9/1973 | Johnsson et al. | 92/19 |
| 4,116,307 A | | 9/1978 | Reinecke | |
| RE29,913 E | * | 2/1979 | Case et al. | 188/265 |
| 4,685,744 A | * | 8/1987 | Luce | 188/265 |
| 4,700,814 A | * | 10/1987 | Mitchell | 188/67 |

(Continued)

FOREIGN PATENT DOCUMENTS

| | | |
|---|---|---|
| AU | A-84 646/82 | 5/1982 |
| JP | 50-106590 | 2/1975 |
| JP | 51-119470 | 10/1976 |
| JP | 53-52869 | 5/1978 |
| JP | 54-035565 | 3/1979 |

(Continued)

*Primary Examiner*—Thomas J Williams
(74) *Attorney, Agent, or Firm*—Carrier, Blackman & Associates P.C.; William D. Blackman; Joseph P. Carrier (57) ABSTRACT

A parking brake system is provided in which a parking brake state is obtained by forward movement of a parking piston in response to the action of a parking control fluid pressure, and a forward operating state of the parking piston is mechanically locked by a lock mechanism. Moreover, an input member of a brake mechanism and the parking piston are connected by a coupling linkage. A lock piston of the lock mechanism moves toward one side in the axial direction when the parking piston moves forward, and a locking part provided at one end of the lock piston engages from the rear with a retaining part provided on a middle section of the coupling linkage while straddling the middle section of the coupling. This enables an automatic parking brake state to be obtained by a simple structure without consuming power.

16 Claims, 9 Drawing Sheets

U.S. PATENT DOCUMENTS

| | | | |
|---|---|---|---|
| 4,723,636 A | 2/1988 | Lallier | |
| 5,056,954 A | 10/1991 | Flux et al. | |
| 5,662,020 A | 9/1997 | Morita et al. | |
| 5,738,416 A * | 4/1998 | Kanjo et al. | 303/7 |
| 6,311,808 B1 | 11/2001 | Feigel et al. | |
| 6,994,191 B2 * | 2/2006 | McCann et al. | 188/265 |
| 7,163,090 B2 * | 1/2007 | Huber et al. | 188/265 |
| 7,188,710 B2 * | 3/2007 | Reuter et al. | 188/72.7 |
| 7,407,233 B2 * | 8/2008 | McCann et al. | 188/265 |
| 7,458,445 B2 * | 12/2008 | Inagaki et al. | 188/72.7 |
| 2006/0071546 A1 * | 4/2006 | Inagaki et al. | 303/115.1 |
| 2007/0278052 A1 | 12/2007 | Inagaki et al. | |

FOREIGN PATENT DOCUMENTS

| | | |
|---|---|---|
| JP | 54-60174 | 4/1979 |
| JP | 54-142770 | 10/1979 |
| JP | 55027546 | 2/1980 |
| JP | 56-141207 | 11/1981 |
| JP | 57-190903 | 11/1982 |
| JP | 62-037531 | 2/1987 |
| JP | 63-025809 | 2/1988 |
| JP | 02-134406 | 5/1990 |
| JP | 04-154468 | 5/1992 |
| JP | 06179355 A * | 6/1994 |
| JP | 08-004803 | 1/1996 |
| JP | 108981 | 4/1997 |
| JP | 10-512947 | 12/1998 |
| JP | 2000-504811 | 4/2000 |
| JP | 2001-116018 | 4/2001 |
| JP | 2003-014015 | 1/2003 |
| WO | WO 2005/033541 A1 | 4/2005 |
| WO | WO 2005/093282 | 10/2005 |

* cited by examiner

PARKING BRAKE SYSTEM

TECHNICAL FIELD

The present invention relates to a parking brake system and, in particular, to a parking brake system in which a parking brake state is obtained by the action of fluid pressure.

BACKGROUND ART

Such a parking brake system is already known from, for example, Patent Publications 1 and 2.
Patent Publication 1: Japanese Patent Publication (PCT) No. 10-512947
Patent Publication 2: Japanese Patent Publication (PCT) No. 2000-504811

DISCLOSURE OF INVENTION

Problems to be Solved by the Invention

In Patent Publication 1, the brake piston is divided into front and rear brake pistons, a spring is provided in a compressed state between a transmission member abutting against the front end of the rear brake piston and a blocking plate fixed to the front brake piston, a latch capable of meshing with inner teeth cut into an inner face of a brake caliper to the rear of the front brake piston is housed within the brake caliper so as to engage with the inner teeth in a state in which the transmission member abuts against the front end of the rear brake piston but disengage from the inner teeth due to the urging force of the spring when the transmission member moves forward relative to the front end of the rear brake piston, and an auxiliary piston is slidably fitted into the rear brake piston, the auxiliary piston being capable of moving the transmission member in the axial direction relative to the rear brake piston. Since it is necessary to cut the inner teeth on the inner face of the brake caliper and house the latch within the brake caliper while dividing the brake piston into the front and rear brake pistons, the structure of the interior of the brake caliper is complicated.

Furthermore, in Patent Publication 2, an adjustment bolt having its front end part fixedly connected to the brake piston is screwed into an adjustment nut, an electromagnet exhibiting an electromagnetic force for making the adjustment nut frictionally engage with a casing is disposed within a brake caliper to the rear of the adjustment nut, and when obtaining a parking brake state, the electromagnet makes the adjustment nut frictionally engage with the casing in a state in which brake fluid pressure acts on the brake piston, thus preventing the brake piston from retreating. However, not only is it necessary to house the electromagnet within the brake caliper, thus making the structure complicated, but it is also necessary to maintain an energized state of a winding of the electromagnet in the parking brake state, thus increasing the power consumption.

The present invention has been accomplished under the above-mentioned circumstances, and it is an object thereof to provide a parking brake system that enables a parking brake state to be obtained by a simple structure without consuming power.

Means for Solving the Problems

In order to achieve the above object, according to the present invention, there is provided a parking brake system comprising: a brake mechanism operating for parking in response to an input into an input member; a parking piston slidably fitted into a casing so as to move forward in response to a parking control fluid pressure acting on a rear face side of the parking piston; coupling means providing a connection between the input member and the parking piston so as to make the brake mechanism operate for parking in response to forward movement of the parking piston; a lock mechanism provided within the casing so as to automatically lock in response to forward movement of the parking piston in order to mechanically lock the parking piston at a forward position and unlock in response to a parking release control fluid pressure acting on the lock mechanism; a fluid pressure source; and fluid pressure control means for controlling a fluid pressure generated by the fluid pressure source so that the parking control fluid pressure and the parking release control fluid pressure can be obtained; the lock mechanism comprising a lock piston that is slidably fitted into the casing while having an axis that is orthogonal to the axis of the parking piston so that at least when the parking piston moves forward an urging force toward one side in the axial direction acts on the lock piston and that is arranged such that a parking release control pressure can act on the lock piston toward the other side in the axial direction; a retaining part that is provided on a middle section of the coupling means; and a locking part that is provided at one end, in the axial direction, of the lock piston in order to mechanically lock a forward operating state of the parking piston by engaging with the retaining part from the rear, the locking part being formed so as to engage with the retaining part while straddling the middle section of the coupling means when the parking piston is at a forward position.

Effects of the Invention

In accordance with the present invention, since making the parking control fluid pressure act on the rear face of the parking piston makes the parking piston move forward and the lock mechanism mechanically lock the forward position of the parking piston, it is possible to obtain a parking brake state automatically; furthermore, when releasing the parking brake state, the parking release control fluid pressure may be made to act on the lock mechanism, and it is possible to automatically obtain a parking brake state by a simple structure without consuming power in the parking brake state.

Furthermore, since the brake mechanism input member and the parking piston are connected via the coupling means, the lock piston of the lock mechanism moves toward one side in the axial direction when the parking piston moves forward, and the locking part provided on one end of the lock piston engages from the rear with the retaining part provided in the middle section of the coupling means while straddling the middle section of the coupling means, the arrangement is such that the forward movement force of the parking piston is transmitted to the input member of the brake mechanism via the coupling means, and at the same time the lock mechanism can be made compact and simple.

EXPLANATION OF REFERENCE NUMERALS AND SYMBOLS

11 Drum Brake as Brake Mechanism
23 Parking Operation Lever as Input Member
26 Casing
33 Parking Piston
43 Lock Mechanism
44 Lock Piston
45 Retaining Part
46 Locking Part
55 Fluid Pressure Source
56 Fluid Pressure Control Means

BEST MODE FOR CARRYING OUT THE INVENTION

Modes for carrying out the present invention are explained below by reference to an embodiment of the present invention shown in the attached drawings.

Embodiment 1

FIG. 1 to FIG. 9 show one embodiment of the present invention.

Figure 1:
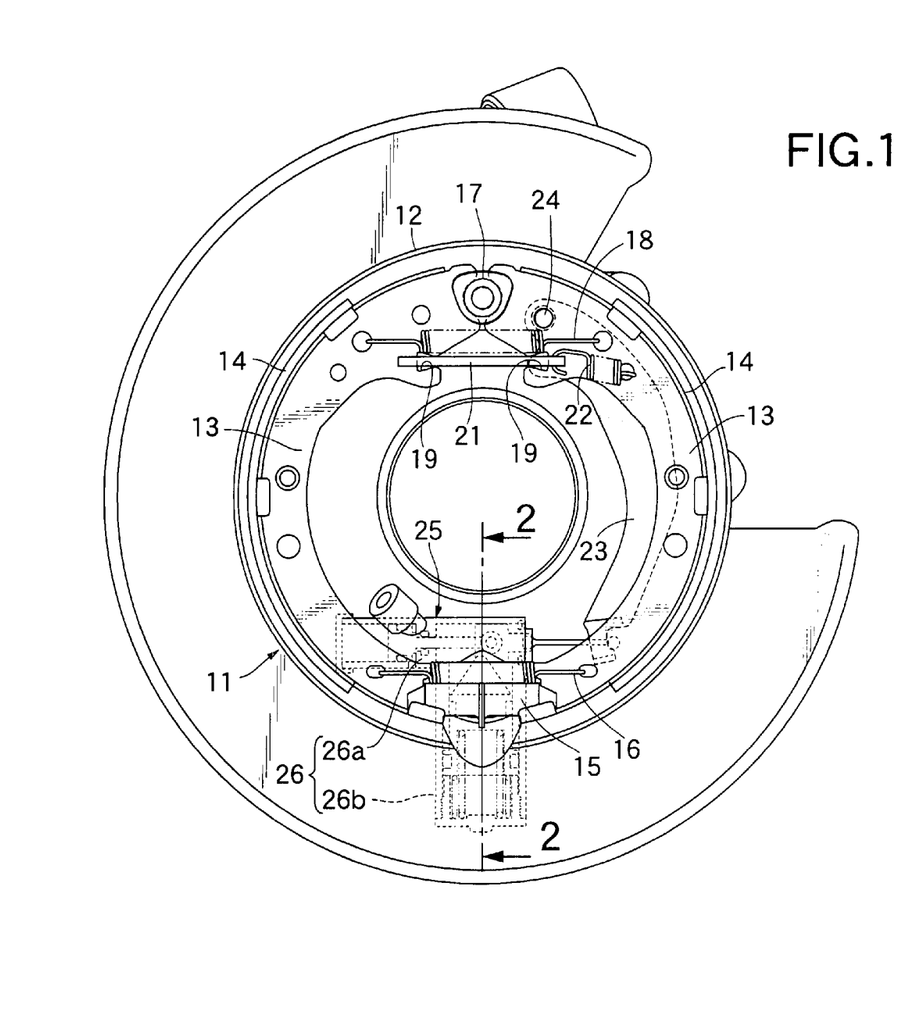
FIG. 1 is a front view of a drum brake (first embodiment).

Referring first to FIG. 1, a back plate 12 of a drum brake 11, which is a brake mechanism exclusively used for a parking brake, is fixedly mounted on a vehicle body side so as to cover an open end of a brake drum (not illustrated). One end of each of a pair of brake shoes 13 and 13 disposed within the brake drum so as to have linings 14 and 14 that can come into sliding contact with the brake drum is swingably supported at respective opposite ends of an extendable strut 15, and a spring 16 is provided in a compressed state between said ends of the two brake shoes 13, the spring 16 urging the two brake shoes 13 toward the opposite end sides of the strut 15. The other end of each of the two brake shoes 13 is supported by an anchor 17 provided on the back plate 12 so that said other end can be separated from the anchor 17 and is urged by a return spring 18 in a direction in which it is supported by the anchor 17. Opposing faces of said other ends of the two brake shoes 13 are provided with notches 19, opposite ends of a strut 21 engage with these notches 19, and a spring 22 is provided in a compressed state between one end of the strut 21 and one of the brake shoes 13.

A parking operation lever 23 as an input member is disposed between said one brake shoe 13 and the back plate 12 so that part of the parking operation lever 23 is superimposed on said one brake shoe 13, and parking drive means 25 is connected to one end of the operation lever 23. The other end part of the parking operation lever 23 engages with one end of the strut 21 and is swingably connected to the other end part of said one brake shoe 13 via a pivot shaft 24.

If the parking operation lever 23 is pivoted around the pivot shaft 24 in a clockwise direction in FIG. 1 by the parking drive means 25 the other brake shoe 13 is pressed against the inner periphery of the brake drum via the strut 21, and the reaction allows said one brake shoe 13 to also be pressed against the inner periphery of the brake drum, thus enabling a parking brake state to be obtained by means of the drum brake 11.

Figure 2:
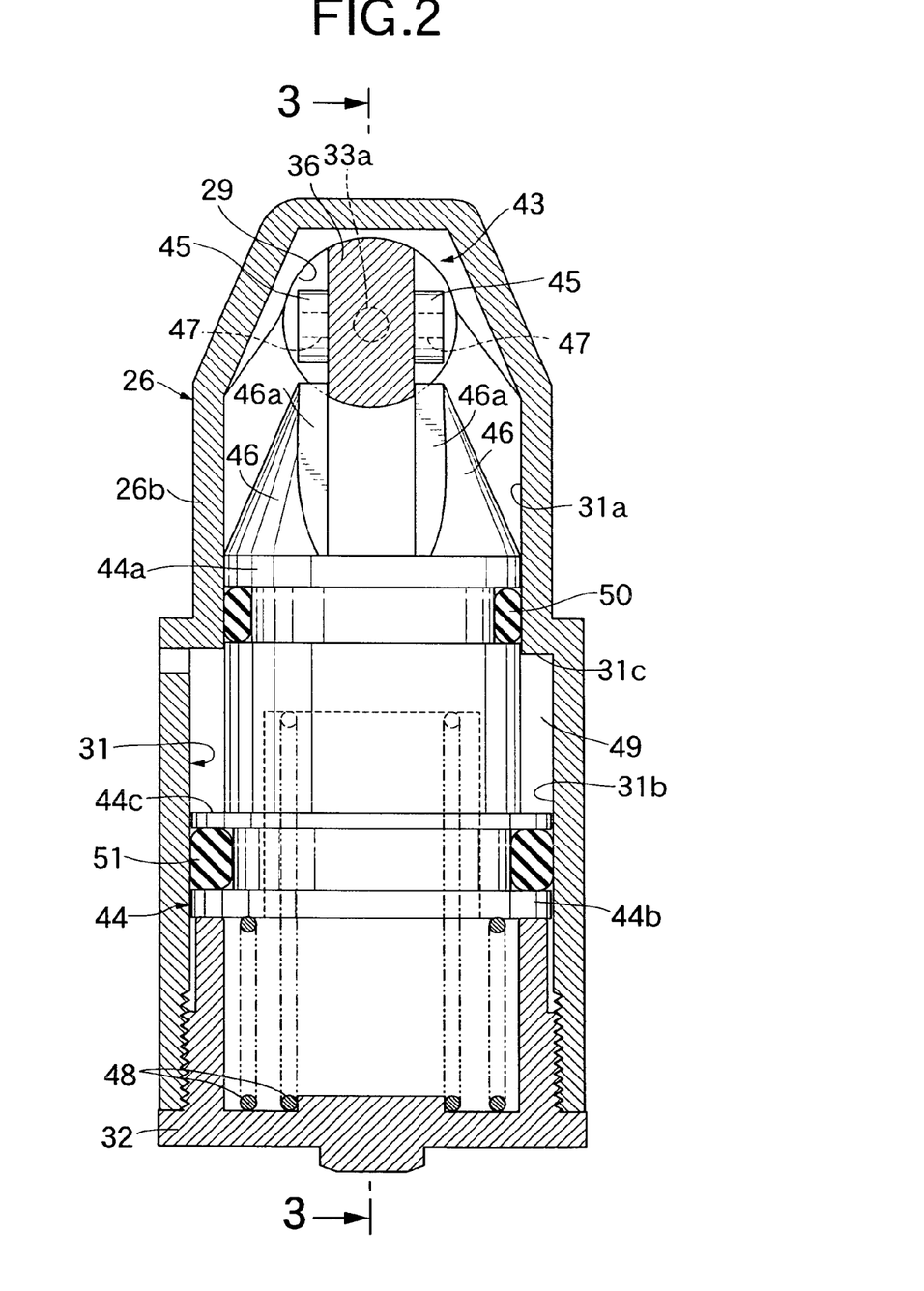
FIG. 2 is an enlarged sectional view along line 2-2 in FIG. 1 (first embodiment).
Figure 3:
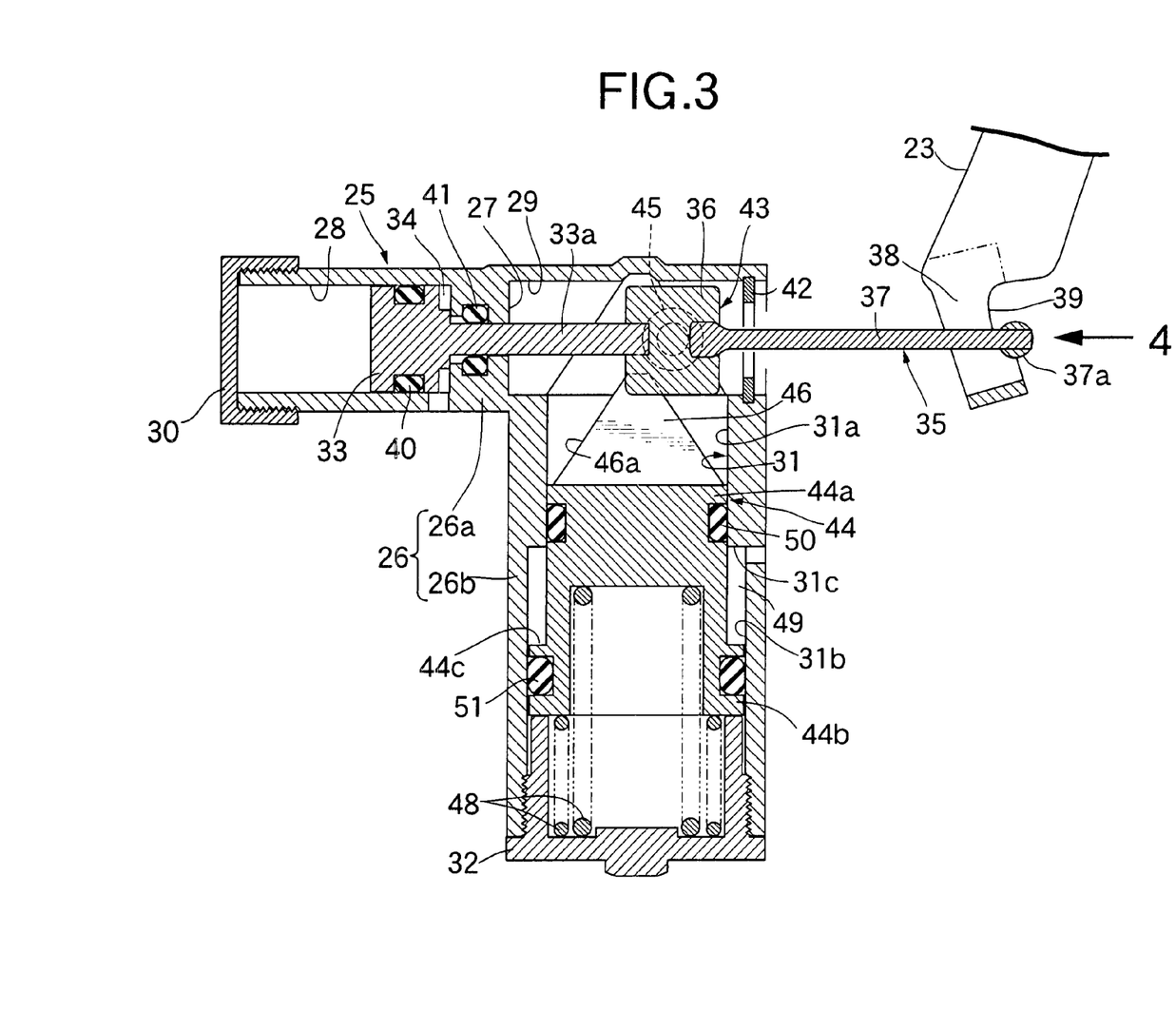
FIG. 3 is a sectional view along line 3-3 in FIG. 2 (first embodiment).

Referring to FIG. 2 and FIG. 3 in combination, the parking drive means 25 includes a casing 26 fixed to the back plate 12 at said one end of the two brake shoes 13. The casing 26 includes a first tubular portion 26a extending in parallel to the strut 15 and the spring 16, and a second tubular portion 26b extending in a direction orthogonal to the first tubular portion 26a and connected integrally to a middle section of the first tubular portion 26a, the first tubular portion 26a being disposed on the inner face side of the back plate 12, and the second tubular portion 26b running through the back plate 12 and extending outward.

A dividing wall 27 is provided integrally with an axially middle section of the first tubular portion 26a, which has opposite ends open, a first slide hole 28 is provided in the first tubular portion 26a on the front side (upper side in FIG. 3) relative to the dividing wall 27, a guide hole 29 is provided within the first tubular portion 26a on the rear side (lower side in FIG. 3) relative to the dividing wall 27, the guide hole 29 being coaxial with the first slide hole 28, and a covering member 30 is screwed onto the first tubular portion 26a so as to close the front end of the first slide hole 28.

Furthermore, a second slide hole 31 is provided in the second tubular portion 26b, the second slide hole 31 being connected to the guide hole 29 at a right angle and being formed by coaxially connecting a small diameter hole portion 31a having one end connected to the guide hole 29 and a large diameter hole portion 31b having a larger diameter than that of the small diameter hole portion 31a and having one end connected coaxially to the other end of the small diameter hole 31a, an annular step portion 31c is formed between the small diameter hole portion 31a and the large diameter hole portion 31b, the annular step portion 31c facing the side opposite to the guide hole 29, and a covering member 32 is screwed into the outer end of the second tubular portion 26b, the covering member 32 closing the other end of the large diameter hole portion 31b.

Slidably fitted into the first slide hole 28 of the casing 26 is a parking piston 33 that enables a parking brake state to be obtained by forward movement in response to a parking control fluid pressure acting on the rear face side, and mounted around the outer periphery of the parking piston 33 is an annular seal 40. A parking control fluid pressure chamber 34 is formed within the first tubular portion 26a of the casing 26 between the rear face of the parking piston 33 and the dividing wall 27, the parking control fluid pressure chamber 34 enabling a parking control fluid pressure to act thereon.

The parking piston 33 is connected to said one end part of the parking operation lever 23 of the drum brake 11 via coupling means 35, a traction acting on the coupling means 35 in response to forward movement of the parking piston 33 is inputted into the parking operation lever 23, and the parking operation lever 23 thereby pivots toward the side that makes the drum brake 11 operate for parking.

The coupling means 35 is formed from a rod 33a, a stopper 36, and a coupling rod 37, the rod 33a hermetically and slidably running through the dividing wall 27 via an annular seal 41 and being coaxially and integrally connected to a central section at the rear end of the parking piston 33, the stopper 36 being connected to the rod 33a and slidably fitted into the guide hole 29, and the coupling rod 37 providing a connection between the stopper 36 and the parking operation lever 23, and a retaining ring 42 is mounted on an end part of the guide hole 29 on the side opposite to the dividing wall 27, the retaining ring 42 preventing the stopper 36 from becoming detached from the guide hole 29.

Figure 4:
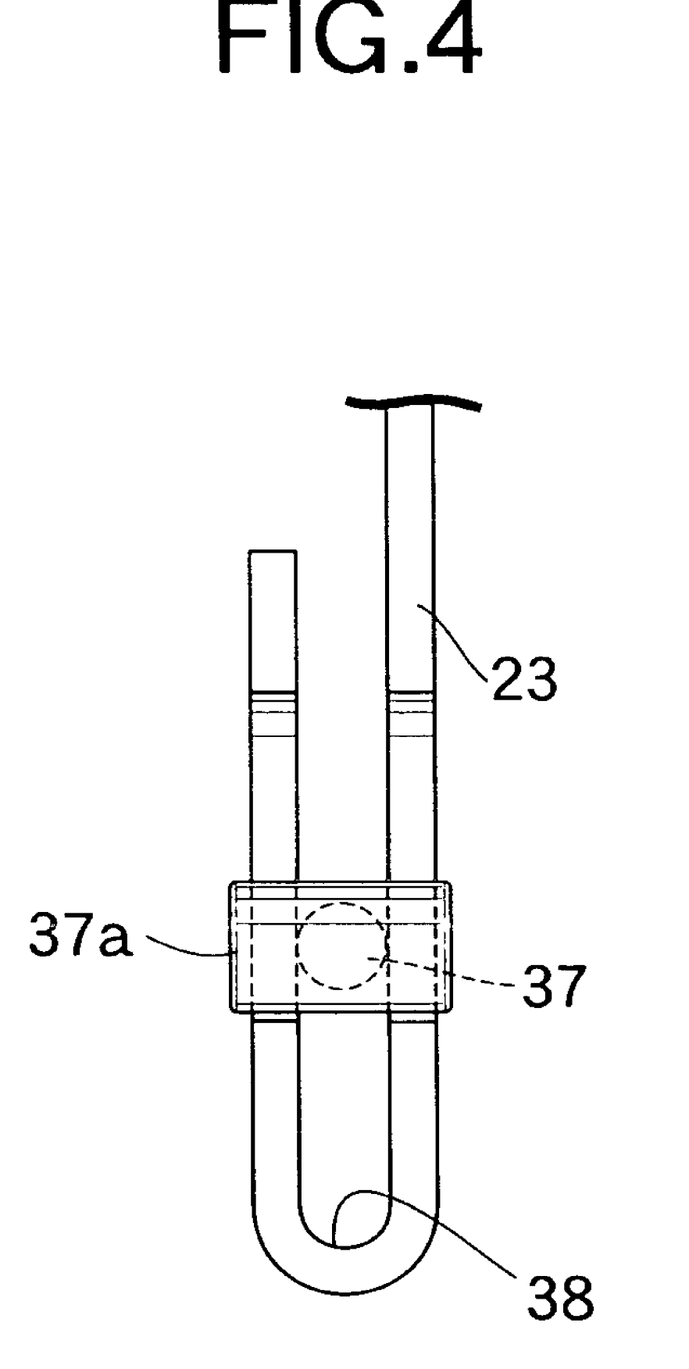
FIG. 4 is a view from arrow 4 in FIG. 3 (first embodiment).

Referring in addition to FIG. 4, said one end part of the parking operation lever 23 is bent into a substantially U-shaped form so as to form a slit 38, and an enlarged engagement portion 37a is provided at an end part of the coupling rod 37, which is inserted through the slit 38, the enlarged engagement portion 37a abutting against and engaging with said one end part of the parking operation lever 23. Moreover, an abutment face 39 provided on the parking operation lever 23 so that the enlarged engagement portion 37a abuts thereagainst and engages therewith has an arc shape and is formed so that not only does the tangent of the abutment face 39 at a point in contact with the enlarged engagement portion 37a when the traction acting on the parking operation lever 23 becomes a maximum accompanying forward movement of the parking piston 33 form a right angle with respect to the direction in which the traction acts on the parking operation lever 23 from the coupling rod 37, but also the above-mentioned tangent at the point in contact with the enlarged engagement portion 37a over the entire stroke region of the coupling rod 37 forms a right angle with respect to the direction in which the traction acts.

Moreover, the outer face shape of at least a portion of the enlarged engagement portion 37a that is in contact with the abutment face 39 is formed in a curved shape protruding toward the abutment face 39.

Furthermore, a lock mechanism 43 is provided within the casing 26, the lock mechanism 43 automatically locking in response to forward movement of the parking piston 33 in order to mechanically lock the parking piston 33 in the forward position and unlocking in response to the action of a parking release control fluid pressure.

This lock mechanism 43 includes a lock piston 44, a pair of retaining parts 45 and 45, and a pair of locking parts 46 and 46, the lock piston 44 being slidably fitted into the casing 26 so as to have an axis that is orthogonal to the axis of the parking piston 33 so that when the parking piston 33 moves forward an urging force toward one side in the axial direction acts on the lock piston 44 and being arranged such that a parking release control pressure can act on the lock piston 44 toward the other side in the axial direction, the retaining parts 45 and 45 being provided on the stopper 36, which is a middle member of the coupling means 35 providing a connection between the parking piston 33 and the parking operation lever 23, and the locking parts 46 and 46 being provided at one end, in the axial direction, of the lock piston 44 in order to mechanically lock the forward position of the parking piston 33 by engaging with the retaining parts 45 and 45 from the rear.

Figure 5:
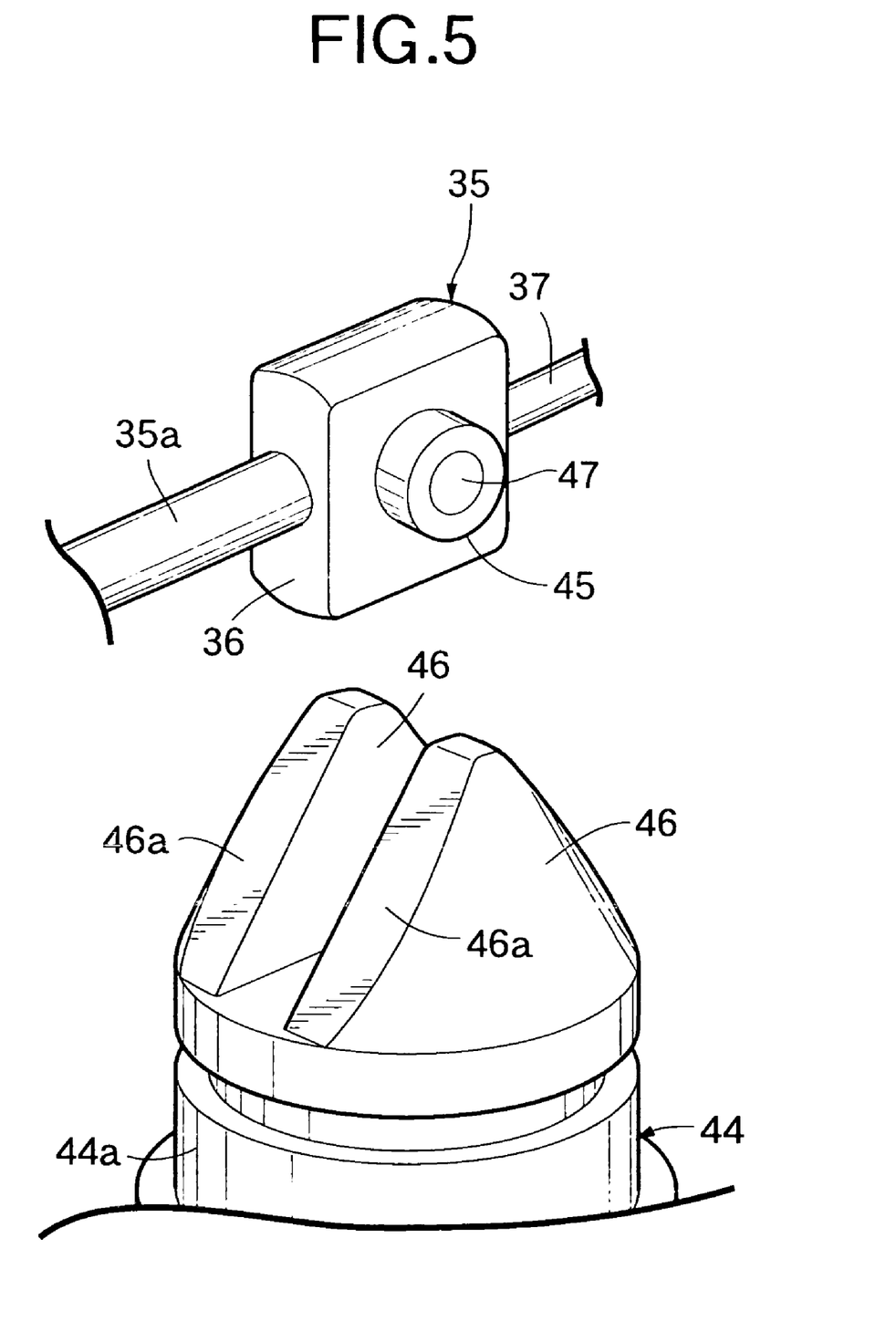
FIG. 5 is a perspective view of a stopper and a lock piston (first embodiment).

Referring in addition to FIG. 5, the stopper 36 is formed so as to have a substantially rectangular cross section in which the thickness in a direction orthogonal to the axes of the second slide hole 31 and the guide hole 29 is small, and the retaining parts 45 and 45, which have a ring shape, are fitted onto and fixed to supporting bosses 47 and 47 projecting from opposite sides of the stopper 36.

The lock piston 44 is slidably fitted into the second slide hole 31, which is positioned to the rear of the parking piston 33, and is formed integrally from a small diameter portion 44a and a large diameter portion 44b, the small diameter portion 44a being slidably fitted into the small diameter hole portion 31a of the second slide hole 31, and the large diameter portion 44b being connected coaxially to the small diameter portion 44a so as to form between itself and a rear part of the small diameter portion 44a an annular step portion 44c facing the step portion 31c of the second slide hole 31, and being slidably fitted into the large diameter hole portion 31b of the second slide hole 31.

A pair of springs 48 and 48 which, for example, are arranged side by side, are provided in a compressed state between the lock piston 44 and the covering member 32 in order to spring-bias the lock piston 44 toward one side in the axial direction, that is, toward the stopper 36 side. An annular parking release control fluid pressure chamber 49 is formed between the step portion 44c of the lock piston 44 and the step portion 31c of the second slide hole 31 between the lock piston 44 and the casing 26, a parking release control fluid pressure for urging the lock piston 44 toward the other side in the axial direction being applied to the parking release control fluid pressure chamber 49, and the pressure-receiving area of the lock piston 44 facing the parking release control fluid pressure chamber 49 is set to be larger than the pressure-receiving area of the parking piston 33 facing the parking control fluid pressure chamber 34.

Furthermore, annular seals 50 and 51 are fitted around the outer periphery of the small diameter portion 44a and the outer periphery of the large diameter portion 44b of the lock piston 44, the annular seals 50 and 51 sealing the parking release control fluid pressure chamber 49 from axially opposite sides and being in sliding contact with the small diameter hole portion 31a and the large diameter hole portion 31b of the second slide hole 31.

The locking parts 46 and 46 are provided integrally with the small diameter portion 44a at one end of the lock piston 44 so as to straddle the stopper 36, which is disposed in the middle section of the coupling means 35, and engage with the retaining parts 45 and 45 when the parking piston 33 is in the forward position and, moreover, the outer peripheral faces of the locking parts 46 and 46 are formed in a tapered shape in which the extremity side is narrowed so that they can engage with the stopper 36 within the guide hole 29, which has a smaller diameter than that of the small diameter hole portion 31a of the second slide hole 31.

Furthermore, engagement faces 46a and 46a are formed on the locking parts 46 and 46, the engagement faces 46a being capable of engaging with the retaining part 45 and 45 from the rear, and these engagement faces 46a and 46a are inclined so that, in going toward one side in the axial direction of the lock piston 44, they are positioned to the rear in the axial direction of the parking piston 33.

Figure 6:
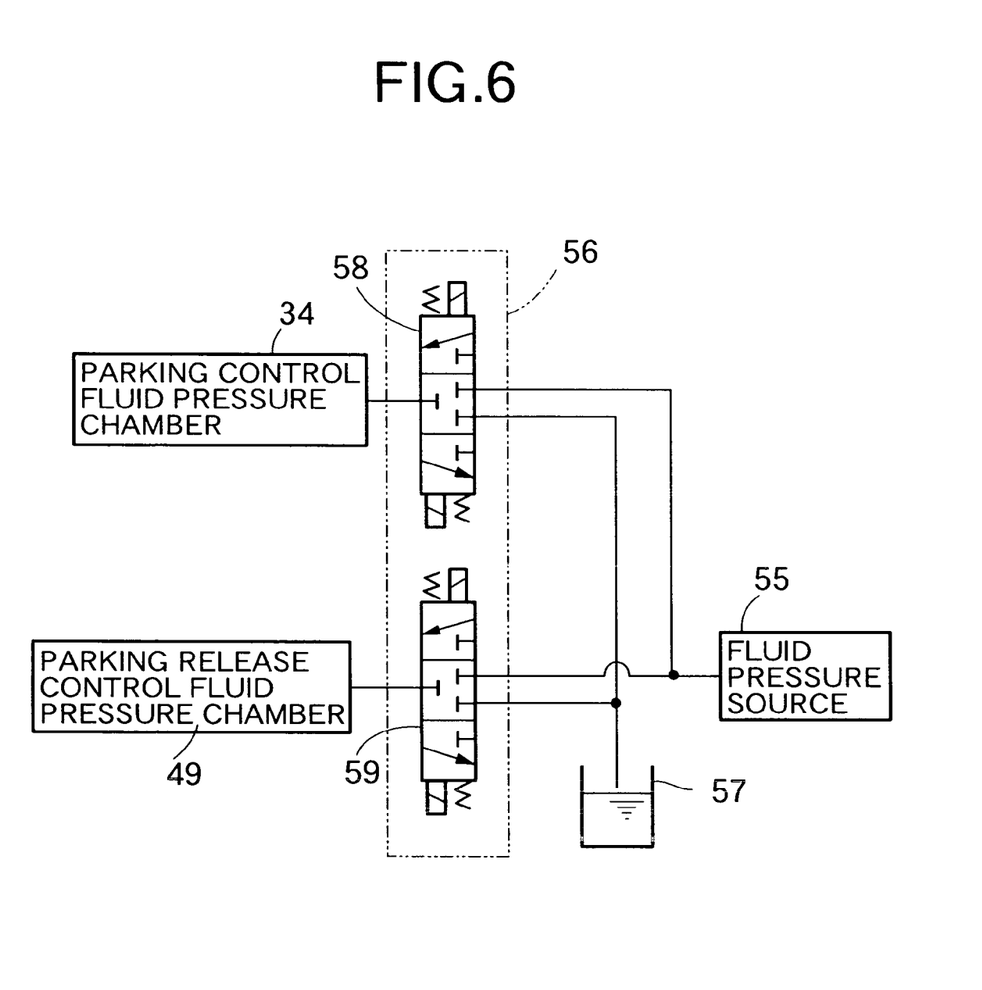
FIG. 6 is a diagram showing the arrangement of a fluid pressure circuit (first embodiment).

In FIG. 6, a parking control fluid pressure acting on the parking control fluid pressure chamber 34 and a parking release control fluid pressure acting on the parking release control fluid pressure chamber 49 are obtained by controlling, using fluid pressure control means 56, the fluid pressure generated by a fluid pressure source 55, and this fluid pressure control means 56 is formed from a first control valve 58 capable of switching between a state in which the parking control fluid pressure chamber 34 communicates selectively with the fluid pressure source 55 or a reservoir 57 and a state in which the fluid pressure of the parking control fluid pressure chamber 34 is locked, and a second control valve 59 capable of switching between a state in which the parking release control fluid pressure chamber 49 communicates selectively with the fluid pressure source 55 or the reservoir 57 and a state in which the fluid pressure of the parking release control fluid pressure chamber 49 is locked.

When obtaining a parking brake state, making a parking control fluid pressure act on the parking control fluid pressure chamber 34 and a fluid pressure act on the parking release control fluid pressure chamber 49 allows the parking piston 33 to move forward while preventing the lock piston 44 from moving axially in one direction. Subsequently, when the fluid pressure of the parking release control fluid pressure chamber 49 is released, the lock piston 44 moves axially in one direction due to the spring force of the springs 48, and the lock mechanism 43 locks in response to forward movement of the parking piston 33 and the lock piston 44.

Figure 7:
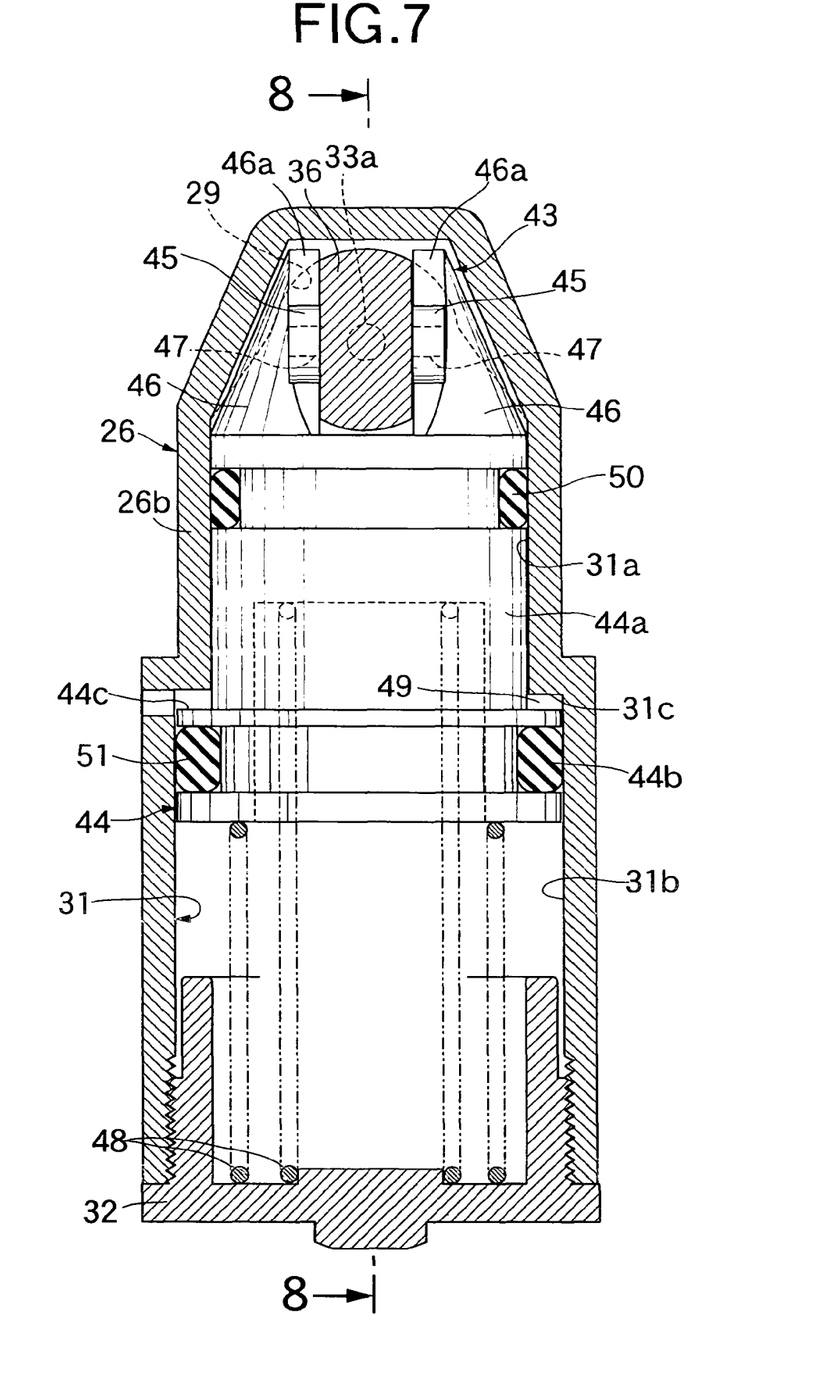
FIG. 7 is a sectional view, corresponding to FIG. 2, in a parking brake state (first embodiment).
Figure 8:
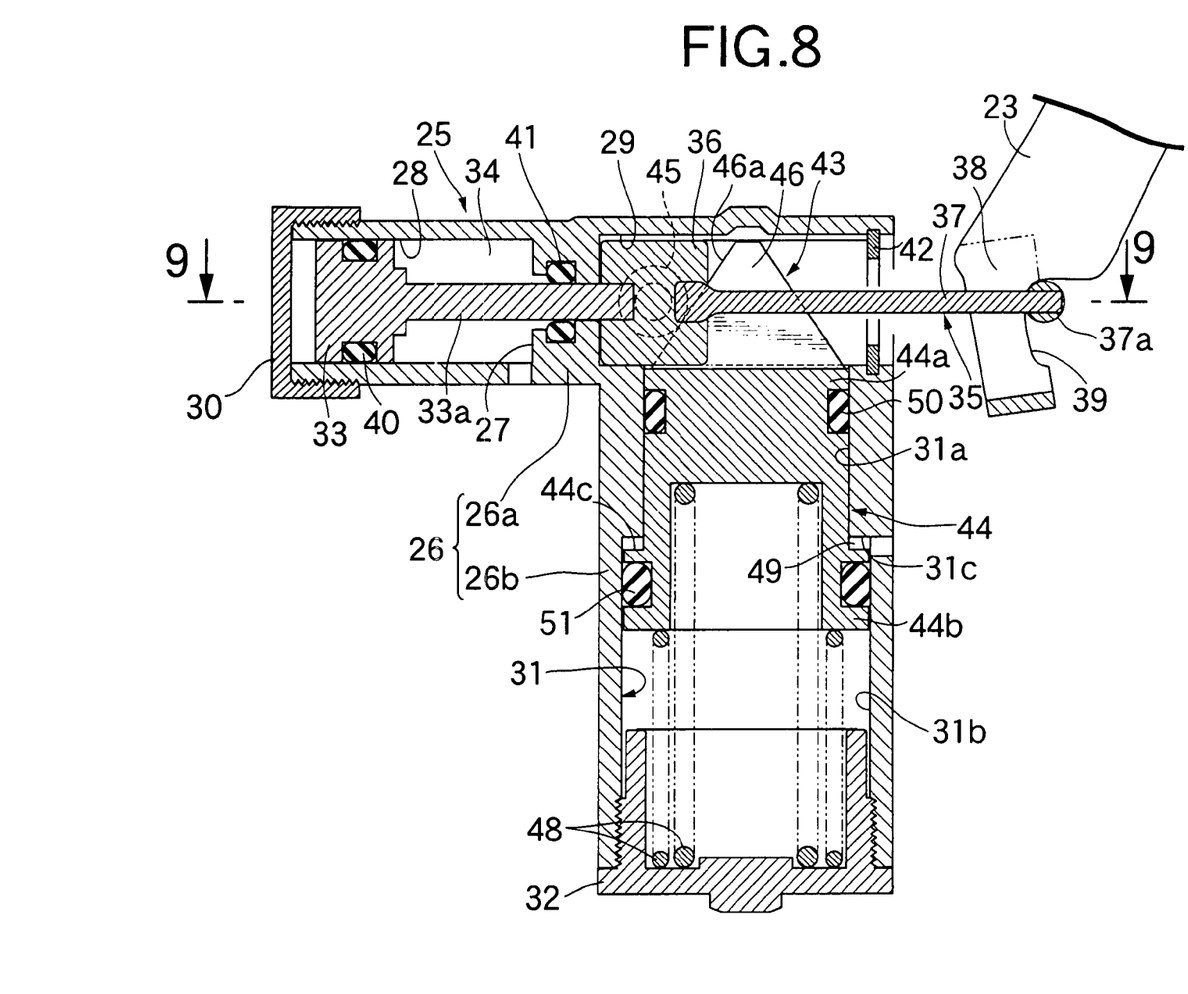
FIG. 8 is a sectional view along line 8-8 in FIG. 7 (first embodiment).
Figure 9:
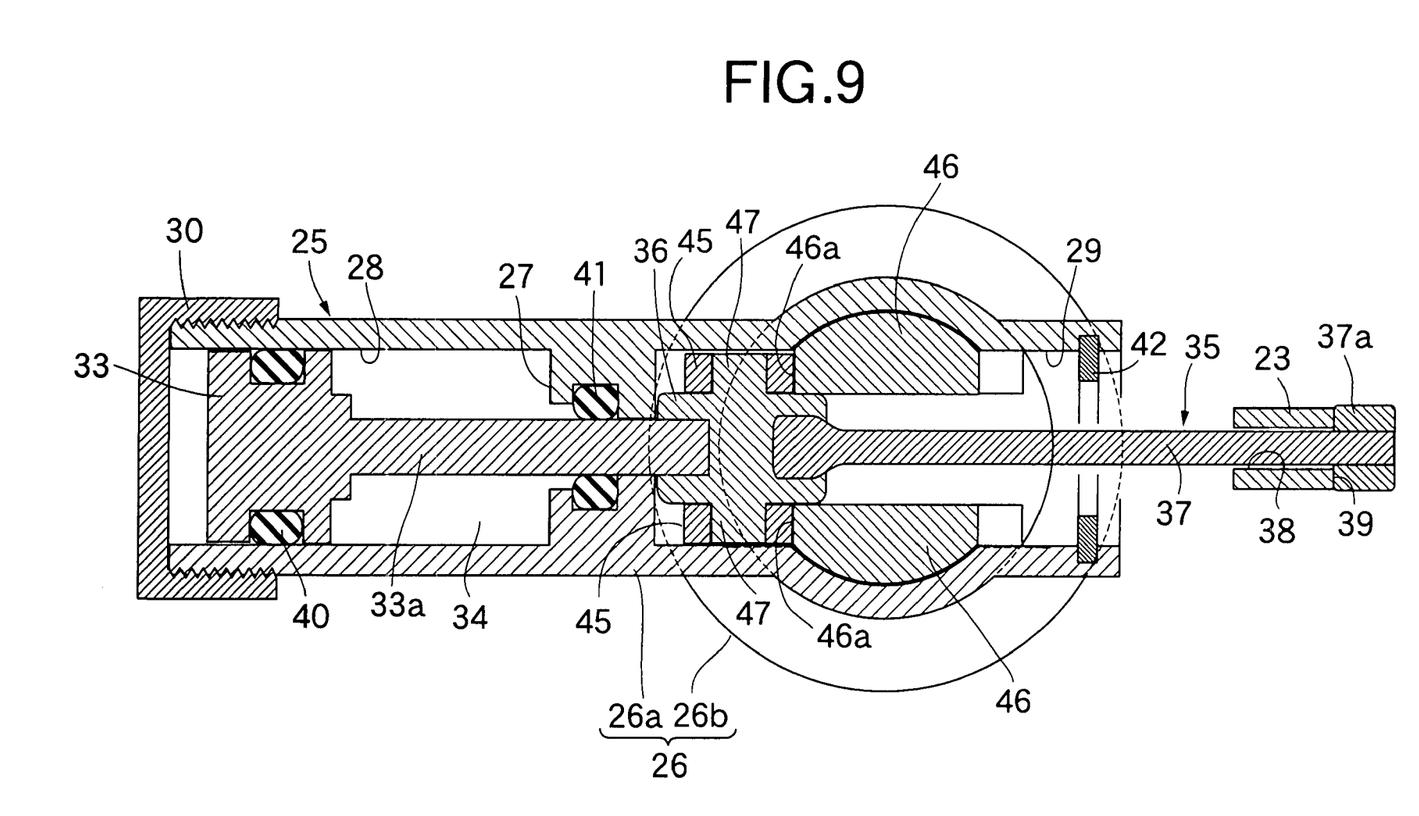
FIG. 9 is a sectional view along line 9-9 in FIG. 8 (first embodiment).

That is, as shown in FIG. 7 to FIG. 9, the engagement faces 46a and 46a formed on the locking parts 46 at one end of the lock piston 44 engage with, from the rear, the two retaining parts 45 and 45 of the stopper 36, which has moved forward together with the parking piston 33, thus mechanically locking the forwardly moved state of the parking piston 33. In addition, residual pressure of the parking control fluid pressure chamber 34 is released when movement of the lock piston 44 toward one side in the axial direction is completed.

In this way, when the parking piston 33 moves forward, the drum brake 11 is operated for parking due to pivoting of the parking operation lever 23, and the forwardly moved state of the parking piston 33 is locked, thereby maintaining the parking brake state. Moreover, since the force for operating the two brake shoes 13 in the drum brake 11 as a parking brake is transmitted to the two brake shoes 13 via the parking operation lever 23, the fluid pressure that has to be exhibited by the parking drive means 25 is relatively small owing to the lever ratio of the parking operation lever 23.

When the parking brake state is released, the fluid pressure of the parking control fluid pressure chamber 34 and the fluid pressure of the parking release control fluid pressure chamber 49 are increased at the same time; during the process of increasing the pressure, a fluid pressure that is greater than the spring force of the springs 48 acts first on the lock piston 44, as a result the lock piston 44 moves toward the other side in the axial direction, the locked state of the lock mechanism 43 is thereby released, and the parking piston 33 is made to retreat by the fluid pressure of the parking control fluid pressure chamber 34. The parking release control fluid pressure chamber 49 is maintained in a fluid pressure locked state while the lock mechanism 43 is unlocked, and the locking parts 46 and 46 of the lock piston 44 move to and remain at a position at which they avoid abutment with the stopper 36.

The operation of this embodiment is now explained. When the drum brake 11 is made to operate as a parking brake, a parking control fluid pressure may be made to act on the parking control fluid pressure chamber 34, which the rear side of the parking piston 33 of the parking drive means 25 faces, the parking piston 33 is moved forward, the drum brake 11 is operated for braking, and a parking brake state can thus be obtained; moreover, since the parking operation state due to forward movement of the parking piston 33 is mechanically locked by the lock mechanism 43, a parking brake state can be obtained automatically. Furthermore, when the parking brake state is released, a parking release control fluid pressure may be made to act on the lock mechanism 43, and a parking brake state can be obtained automatically by a simple structure without consuming power in the parking brake state.

The lock mechanism 43 includes the lock piston 44, which is slidably fitted into the casing 26 so as to have an axis that is orthogonal to the axis of the parking piston 33 so that when the parking piston 33 moves forward an urging force toward one side in the axial direction acts on the lock piston 44 and which enables a parking release control pressure to act on the lock piston 44 toward the other side in the axial direction, the retaining parts 45, which are provided on the stopper 36 connected to the parking piston 33, and the locking parts 46, which are provided at one end, in the axial direction, of the lock piston 44 and which have the engagement faces 46a that mechanically lock the forward position of the parking piston 33 by engaging with the retaining parts 45 from the rear, the engagement faces 46a being inclined so that, in going toward one side in the axial direction of the lock piston 44, they are positioned to the rear in the axial direction of the parking piston 33.

It is therefore possible to mechanically lock the forward position of the parking piston 33 in accordance with a change in the amount of forward movement of the parking piston 33 from a retreat limit in the parking brake state, and a change in the stroke of the parking piston 33 according to dimensional tolerance, assembly error, or wear of the linings 14 of the brake shoes 13 can be dealt with.

Moreover, since the stopper 36, on which the retaining parts 45 are provided, is disposed in a middle section of the coupling means 35, which provides a connection between the parking piston 33 and the parking operation lever 23, and the locking parts 46 and 46 are provided at one end of the lock piston 44 so as to straddle the stopper 36, the arrangement is such that the forward movement force of the parking piston 33 is transmitted to the parking operation lever 23 of the drum brake 11 via the coupling means 35, and at the same time the lock mechanism 43 can be made compact and simple.

Furthermore, the enlarged engagement portion 37a provided on the end part of the coupling rod 37, which is a part of the coupling means 35, abuts against and engages with said one end of the parking operation lever 23, and the arc-shaped abutment face 39 provided on the parking operation lever 23 so as to abut against and engage with the enlarged engagement portion 37a is formed so that not only does the tangent of the abutment face 39 at the point in contact with the enlarged engagement portion 37a when the traction acting on the parking operation lever 23 becomes a maximum accompanying forward movement of the parking piston 33 form a right angle with respect to the direction in which the traction acts on the parking operation lever 23 from the coupling rod 37, but also the above-mentioned tangent at the point in contact with the enlarged engagement portion 37a over the entire stroke region of the coupling rod 37 forms a right angle with respect to the direction in which the traction acts.

Therefore, when the traction acting on the parking operation lever 23 becomes a maximum, not only is it possible to prevent galling between the coupling rod 37 and the parking operation lever 23, thus improving the durability, but it is also possible to prevent galling between the coupling rod 37 and the parking operation lever 23 over the entire stroke region of the coupling rod 37, thereby further improving the durability.

Furthermore, since the outer face shape of at least the portion of the enlarged engagement portion 37a that is in contact with the abutment face 39 is formed in a curved shape that protrudes toward the abutment face 39, it is possible to prevent galling between the coupling rod 37 and the parking operation lever 23 more effectively, and it is also possible to alleviate stress by making the contact area between the parking operation lever 23 and the enlarged engagement part 37a relatively large.

Moreover, since the coupling rod 37 can be engaged with and coupled to the parking operation lever 23 by inserting the coupling rod 37 through the slit 38 provided in the parking operation lever 23, the ease of assembly is excellent.

Although an embodiment of the present invention is explained above, the present invention is not limited to the above-mentioned embodiment and may be modified in a variety of ways as long as the modifications do not depart from the present invention described in Claims.

The invention claimed is:

1. A parking brake system comprising:
   a brake mechanism for releasably locking a wheel during parking in response to an input into an input member;
   a casing;
   a parking piston slidably fitted into the casing and configured so as to move forward in response to a parking control fluid pressure acting on a rear face side of the parking piston;
   a coupling linkage providing a linking connection between the input member and the parking piston so as to make the brake mechanism operate for parking in response to forward movement of the parking piston;
   a lock mechanism provided within the casing so as to automatically lock in response to forward movement of the parking piston in order to mechanically lock the parking piston at a forward position thereof, and unlock in response to a parking release control fluid pressure acting on the lock mechanism;

a fluid pressure source and a fluid pressure control member for controlling a fluid pressure generated by the fluid pressure source so that the parking control fluid pressure and the parking release control fluid pressure can be obtained;

the lock mechanism comprising a lock piston that is slidably fitted into the casing while having an axis that is orthogonal to the axis of the parking piston so that at least when the parking piston moves forward an urging force toward one side in the axial direction acts on the lock piston and that is arranged such that a parking release control pressure can act on the lock piston toward the other side in the axial direction;

a retaining part that is provided on a middle section of the coupling linkage;

and a locking part that is provided at one end, in the axial direction, of the lock piston in order to mechanically lock a forward operating state of the parking piston by engaging with the retaining part from the rear, the locking part being formed so as to engage with the retaining part while straddling the middle section of the coupling linkage only when the parking piston is at the forward position thereof;

wherein the retaining part is provided on a stopper at the middle section of the coupling linkage, the stopper comprising a block body having a substantially rectangular cross-section, and wherein the retaining part comprises projections which extend outwardly on opposite sides of the block body.

2. The parking brake system according to claim 1, wherein the locking part is configured to lock the forward position of the parking piston by engaging the projections of the retaining part.

3. The parking brake system according to claim 1, wherein the locking part is integrally provided with the lock piston, and is configured and arranged to straddle the stopper.

4. The parking brake system according to claim 3, wherein the locking part includes engagement faces for engaging the projections of the retaining part.

5. The parking brake system according to claim 4, wherein the engagement faces engage with the projections of the retaining part from the rear to mechanically lock the parking piston in a forward position thereof.

6. The parking brake system according to claim 5, wherein the engagement faces are inclined to engage the projections of the retaining part.

7. The parking brake system according to claim 6, wherein the coupling linkage comprises a piston rod, the stopper connected to the piston rod and a coupling rod connected to the stopper on a side thereof opposite the piston rod, the piston rod slidably extending through a dividing wall of the casing and coaxially connected to the parking piston.

8. A parking brake system comprising:
an input member;
a brake mechanism for releasably locking a wheel during parking in response to an input into the input member;
a casing including a first cylinder portion extending in a first direction and having a first sliding bore formed therein and a dividing wall in the first sliding bore, and a second cylinder portion extending in a second direction which is substantially perpendicular to the first direction, said second cylinder portion having a second sliding bore formed therein which communicates with said first sliding bore;
a parking piston slidably fitted into the first sliding bore of said casing and arranged so as to move forward in response to a parking control fluid pressure acting on a rear face side of the parking piston;

a coupling linkage connecting the input member and the parking piston so as to make the brake mechanism operable in response to forward movement of the parking piston, the coupling linkage comprising a piston rod, a stopper connected to the piston rod and a coupling rod connected to the stopper on a side thereof opposite the piston rod, the piston rod slidably extending through the dividing wall and coaxially connected to the parking piston;

a lock mechanism provided within the casing which automatically mechanically locks the parking piston at a forward position thereof in response to forward movement of the parking piston and unlocks in response to a parking release control fluid pressure acting on the lock mechanism;

a fluid pressure source and a fluid pressure control member for controlling a fluid pressure generated by the fluid pressure source so that the parking control fluid pressure and the parking release control fluid pressure can be obtained;

the lock mechanism comprising a lock piston that is slidably fitted into the second sliding bore of the casing so that at least when the parking piston moves forward an urging force toward one side in the axial direction acts on the lock piston and that is arranged such that a parking release control pressure can act on the lock piston toward the other side in the axial direction;

a retaining part comprising projections on opposite sides of the stopper; and a locking part that is provided at one end, in the axial direction, of the lock piston in order to mechanically lock a forward operating state of the parking piston by engaging with the retaining part from the rear, the locking part formed so as to engage with the retaining part of the coupling linkage when the parking piston is at the forward position thereof.

9. The parking brake system according to claim 8, wherein the locking part is formed so as to engage with the retaining part only when the parking piston is at the forward position thereof.

10. The parking brake system of claim 8, further comprising at least one spring disposed in the casing on one side of the lock piston and urging the lock piston toward the coupling linkage.

11. The parking brake system of claim 8, wherein the locking part is configured to lock the forward position of the parking piston by engaging the projections of the retaining part.

12. The parking brake system according to claim 8, wherein the stopper comprises a block body having a substantially rectangular cross-section and the projections of the retaining part project from opposite sides of the block body.

13. The parking brake system according to claim 12, wherein the locking part is integrally provided with the lock piston, and configured and arranged to straddle the block body.

14. The parking brake system according to claim 13, wherein the locking part includes engagement faces for engaging the projections of the retaining part.

15. The parking brake system according to claim 14, wherein the engagement faces engage with the projections of the retaining part from the rear in order to mechanically lock the parking piston in a forward position.

16. The parking brake system according to claim 15, wherein the engagement faces are inclined to engage the projections of the retaining part.

* * * * *